US008805738B2

(12) United States Patent
Nethery, III

(10) Patent No.: US 8,805,738 B2
(45) Date of Patent: Aug. 12, 2014

(54) METHOD AND APPARATUS FOR VERIFYING FINANCIAL ACCOUNT INFORMATION

(75) Inventor: Stanton Kee Nethery, III, Emeryville, CA (US)

(73) Assignee: Kagi, Inc., Berkeley, CA (US)

(*) Notice: Subject to any disclaimer, the term of this patent is extended or adjusted under 35 U.S.C. 154(b) by 790 days.

(21) Appl. No.: 12/574,280

(22) Filed: Oct. 6, 2009

(65) Prior Publication Data

US 2010/0023423 A1 Jan. 28, 2010

Related U.S. Application Data

(62) Division of application No. 10/457,548, filed on Jun. 10, 2008.

(51) Int. Cl.
*G06Q 40/00* (2012.01)
*G06Q 20/40* (2012.01)

(52) U.S. Cl.
CPC ............... *G06Q 20/40* (2013.01); *G06Q 40/00* (2013.01)
USPC .................................. 705/39; 705/44; 705/35

(58) Field of Classification Search
CPC ............................. G06Q 20/40; G06Q 40/00
USPC ................................................ 705/39, 44, 35
See application file for complete search history.

(56) References Cited

U.S. PATENT DOCUMENTS

| 4,743,747 A | 5/1988 | Fougere et al. |
|---|---|---|
| 5,311,594 A | 5/1994 | Penzias |
| 5,384,449 A | 1/1995 | Peirce |
| 5,416,306 A | 5/1995 | Imahata |
| 5,478,993 A | 12/1995 | Derksen |
| 5,479,510 A | 12/1995 | Olsen et al. |
| 5,708,422 A | 1/1998 | Blonder et al. |
| 5,727,163 A | 3/1998 | Bezos |
| 5,757,917 A | 5/1998 | Rose et al. |
| 5,790,429 A | 8/1998 | Baker et al. |
| 5,790,790 A | 8/1998 | Smith et al. |

(Continued)

FOREIGN PATENT DOCUMENTS

| CA | 2 309 013 | 11/2001 |
|---|---|---|
| DE | 200 14 381 | 1/2001 |

(Continued)

OTHER PUBLICATIONS

Brad Stone, "Busting the Web Bandits", Newsweek, pp. 55, Jul. 16, 2001.

(Continued)

*Primary Examiner* — Thomas M Hammond, III
*Assistant Examiner* — John Scarito
(74) *Attorney, Agent, or Firm* — Diederiks & Whitelaw, PLC

(57) ABSTRACT

An apparatus and method for verifying a customer's financial information is disclosed wherein a seller accepts information about the details of price and quantity of the goods to be purchased, and accepts information about customer's financial account. Payment is authorized or processed for desired goods in a variable transaction amount that is not equal to the total price of the goods. Then the amount of the transaction is received from the customer and compared to the amount charged to the bank. If the two amounts match then the goods are shipped to the customer and if not already processed payment is settled.

11 Claims, 6 Drawing Sheets

(56) References Cited

U.S. PATENT DOCUMENTS

| | | | |
|---|---|---|---|
| 5,809,144 A | 9/1998 | Sirbu et al. |
| 5,822,727 A | 10/1998 | Garberg et al. |
| 5,822,737 A | 10/1998 | Ogram |
| 5,826,241 A | 10/1998 | Stein et al. |
| 5,872,917 A | 2/1999 | Hellman |
| 5,878,337 A | 3/1999 | Joao et al. |
| 5,883,810 A | 3/1999 | Franklin et al. |
| 5,907,142 A | 5/1999 | Kelsey |
| 5,909,492 A | 6/1999 | Payne et al. |
| 5,963,917 A | 10/1999 | Ogram |
| 5,978,774 A | 11/1999 | Rogers et al. |
| 5,991,738 A | 11/1999 | Ogram |
| 6,000,832 A | 12/1999 | Franklin et al. |
| 6,014,650 A | 1/2000 | Zampese |
| 6,021,399 A | 2/2000 | Demers et al. |
| 6,023,682 A | 2/2000 | Checchio |
| 6,029,150 A | 2/2000 | Kravitz |
| 6,032,863 A | 3/2000 | Nethery, III |
| 6,058,179 A | 5/2000 | Shaffer et al. |
| 6,067,529 A | 5/2000 | Ray et al. |
| 6,070,798 A | 6/2000 | Nethery |
| 6,088,683 A | 7/2000 | Jalili |
| 6,095,413 A | 8/2000 | Tetro et al. |
| 6,122,624 A | 9/2000 | Tetro et al. |
| 6,192,407 B1 | 2/2001 | Smith et al. |
| 6,205,437 B1 | 3/2001 | Gifford |
| 6,226,624 B1 * | 5/2001 | Watson et al. | 705/44 |
| 6,227,447 B1 | 5/2001 | Campisano |
| 6,246,996 B1 | 6/2001 | Stein et al. |
| 6,327,348 B1 | 12/2001 | Walker et al. |
| 6,341,724 B2 | 1/2002 | Campisano |
| 6,381,584 B1 | 4/2002 | Ogram |
| 6,385,504 B1 | 5/2002 | Pintsov et al. |
| 6,477,578 B1 | 11/2002 | Mhoon |
| 6,496,936 B1 | 12/2002 | French et al. |
| 6,612,488 B2 | 9/2003 | Suzuki |
| 6,836,765 B1 | 12/2004 | Sussman |
| 6,839,692 B2 | 1/2005 | Carrott et al. |
| 6,981,216 B1 | 12/2005 | Brandes |
| 7,275,685 B2 | 10/2007 | Gray et al. |
| 2001/0001204 A1 | 5/2001 | Campisano |
| 2001/0003175 A1 | 6/2001 | Kim |
| 2001/0029496 A1 | 10/2001 | Otto et al. |
| 2001/0044785 A1 | 11/2001 | Stolfo et al. |
| 2001/0056410 A1 | 12/2001 | Ishigaki |
| 2002/0004772 A1 * | 1/2002 | Templeton et al. | 705/35 |
| 2002/0016765 A1 | 2/2002 | Sacks |
| 2002/0023054 A1 | 2/2002 | Gillespie |
| 2002/0052841 A1 | 5/2002 | Guthrie et al. |
| 2002/0069177 A1 | 6/2002 | Carrott et al. |
| 2002/0077978 A1 | 6/2002 | O'Leary et al. |
| 2002/0082995 A1 | 6/2002 | Christie, IV |
| 2002/0084320 A1 | 7/2002 | Hoffman et al. |
| 2002/0116329 A1 | 8/2002 | Serbetcioglu et al. |
| 2002/0120846 A1 | 8/2002 | Stewart et al. |
| 2002/0130176 A1 | 9/2002 | Suzuki |
| 2002/0156724 A1 | 10/2002 | Levchin et al. |
| 2002/0165830 A1 | 11/2002 | Kremer |
| 2003/0055781 A1 | 3/2003 | Ong |
| 2003/0061163 A1 | 3/2003 | Durfield |
| 2003/0061167 A1 | 3/2003 | Mann, III et al. |
| 2003/0101134 A1 | 5/2003 | Liu et al. |
| 2003/0126036 A1 | 7/2003 | Mascavage, III et al. |
| 2003/0200182 A1 | 10/2003 | Truitt et al. |
| 2004/0088258 A1 | 5/2004 | McCoy et al. |
| 2004/0230527 A1 | 11/2004 | Hansen et al. |
| 2005/0075985 A1 | 4/2005 | Cartmell |
| 2005/0097049 A1 * | 5/2005 | Writer et al. | 705/44 |
| 2006/0026097 A1 | 2/2006 | Nethery, III |
| 2007/0051795 A1 | 3/2007 | Shipman |

FOREIGN PATENT DOCUMENTS

| | | |
|---|---|---|
| JP | 403074788 A | 3/1991 |
| WO | WO 02/05224 | 1/2002 |
| WO | WO 02/17181 | 2/2002 |
| WO | WO 03/017049 | 2/2003 |

OTHER PUBLICATIONS

Bodow, Steve, *Wired Magazine*, "The Money Shot", Sep. 2001.
European Patent Office, European Search Report, EP 04253347, Oct. 7, 2004.
Office Action dated Apr. 24, 2008 in U.S. Appl. No. 10/457,548.
Office Action dated Jun. 16, 2008 in U.S. Appl. No. 11/219,713.
Office Action dated Jul. 9, 2008 in U.S. Appl. No. 10/902,046.

* cited by examiner

METHOD AND APPARATUS FOR VERIFYING FINANCIAL ACCOUNT INFORMATION

CROSS-REFERENCE TO RELATED APPLICATIONS

This application is a divisional of U.S. patent application Ser. No. 10/457,548 filed on Jun. 10, 2003 entitled "Method and Apparatus for Verifying Financial Account Information", pending.

BACKGROUND OF THE INVENTION

1. Field of the Invention

The present invention is generally directed to methods of carrying out financial transactions over a computer network and more particularly transactions involving credit card, debit card or electronic funds transfer from bank accounts.

2. Discussion of the Prior Art

Increasingly, buyers and sellers involved in commerce are turning to the internet to conduct their business electronically in a relatively fast and quick manner. The internet is particularly attractive to buyers because it provides a vast knowledge base from which they can research and find information about perspective purchases of various goods. Time can be saved because the consumer does not have to travel to various places such as a library or store to obtain information regarding the various goods to be purchased. Indeed, the entire process of shopping for goods and services can be completed using a personal computer at one's home so long as the computer is connected to a network such as the internet. As time has passed, new opportunities for shopping via personal computer have increased as more and more people gain access to the internet and more and more businesses provide services on the internet.

Likewise, using the internet for commerce is extremely attractive to businesses as they can provide the same type of information that was traditionally provided through catalogs and other advertising. Furthermore, transactions can occur between customers and sellers in a similar manner as was usually done at a checkout stand in a store. Indeed in the case of informational products, such as computer software, videos, or music, the goods themselves can be delivered through the internet and payment can be received through the internet so that the entire transaction occurs through a computer network without the customer or merchant ever actually meeting in a store. This method of doing business provides tremendous cost savings to manufacturers and sellers. Even items that have to be physically shipped can benefit from this form of commerce. Once a customer has browsed through a merchant's website and selected various goods that they wish to purchase, the merchant simply needs to verify the payment and then ship the goods to the customer. The verification of payment step has led to most of the problems and, indeed, is restricting commerce on the internet.

One of the reasons that the vast number of merchants already using such networks have had trouble increasing sales volume on these networks is the inherent difficulties involved with customers paying for their purchases. The problem facing merchants is how do they determine that payment data actually belongs to the customer attempting to use it. One solution to this problem of course is that a potential purchaser can provide a merchant with a credit card number which is transmitted over the network. Of course this presents numerous security problems for both the seller and the buyer. For example, the credit card number could be obtained by an unauthorized third party during the transmission of the information from the customer to the seller. Even if a secured network is used wherein such third parties are precluded from gaining access to credit card data transmitted over the network, it does not address the problem of a customer using a stolen credit card in the first place. As such a dishonest person could use a credit card number that was stolen, send it on the secured network, yet the merchant would still be out of luck, because only after the goods were shipped to the customer would the merchant realize that the wrong person's credit card had been used.

In the case where a credit card number is stolen, thousands of dollars can be lost as the third party who obtained this data uses the credit card for numerous fraudulent transactions until the credit card is canceled. Also, the issuer of the credit card is still out of money when the credit card number itself has been stolen prior to the transaction taking place.

A few companies on the internet have proposed solutions to this problem. For example, Pay/Pal®, a company currently owned by eBay® which processes transactions in financial payments conducted on the internet, has proposed a method where they deposit into U.S. bank accounts very small amounts of money such as five to twenty-eight cents before the main transaction occurs. After that, the customer must check their own bank accounts, obtain these numbers and then provide the numbers to Pay/Pal® in order to verify that the bank account given is indeed their account. Unfortunately, this method has some distinct disadvantages. First of all, money is being sent to an account that may never actually be used. Second of all, this method requires several transactions, for example, Pay/Pal® initially has to send money to the account in order to verify that the account is valid and presumably this must be done for every account to be checked. Furthermore, it may have to be repeated over time to ensure the accounts have not been canceled. It is only after an account has been verified that Pay/Pal® can conduct an actual transaction. It must be remembered that the whole goal of the internet is to provide an efficient, time saving and low cost method of doing business. Every additional action a customer must take in order to provide security can result in lost business for a merchant.

Another proposed solution is set forth by Templeton et al. in U.S. Patent Application Publication No. 2001/0004772 directed to a system and method for verifying a financial instrument, which is incorporated herein by reference. Templeton et al. proposes a system initiating one or more verifying transactions involving an instrument, with details that may vary from one transaction to another such as the type of transaction (e.g., deposit, credit, debit), amount of the transaction, number of transactions, the merchant or vendor name or account for the transaction, and so on. Selected details, particularly variable ones are saved to the system. The user obtains information regarding a transaction by accessing the account on-line, via telephone, in a monthly statement, etc. The user then submits the requested details to the system, which compares them to stored details. If the details correspond, then the user may be allowed to use the instrument to purchase a product. While this solution is effective as far it goes, it does not address the particular problems addressed by this invention. Specifically, the method disclosed by Templeton et al. requires that a transaction occur wherein money is transferred from a vendor to a financial institution. While such an amount may be small per transaction, when millions of transactions are involved, such costs can rise quickly. Additionally, the Templeton et al. publication does not address the problems of foreign currency transactions. Since there are fluctuations in foreign currency values, it would be difficult to confirm amounts charged to a financial institution without knowing the exact date of the transaction and the exchange rate on that date.

Therefore, there exists a need in the art for an inexpensive way to verify that a consumer's account is not fraudulent in a rapid manner which may also be used in international transactions.

SUMMARY OF THE INVENTION

In general, the invention is directed to a method of verifying ownership of credit cards, debit numbers, bank accounts etc. More specifically, a credit card, debit number or bank account used by a customer can be verified while a purchase is being made so that illegal transactions and fraud can be avoided. After a store accepts purchase information from the customer, the store processes the payment in one or more steps and in one or more separate transactions. Before the goods are shipped to the customer or transferred to his or her control, the customer must go to his or her account, obtain the specific transaction amounts, and provide them to the store. If the data supplied by the customer matches the store records, then the goods may be shipped to the customer. Alternatively, the customer may authorize a store to vary the total amount of the transaction from say $100.00 to $106.00. Thus the transactions do not need to total the exact amount of the purchase of say $103.00. Additionally, a text note or code can be attached to a transaction which is viewable only by a customer. The customer then can verify the code so that the transaction can go forth. One of the advantages of using multiple transactions is that the ratio between the transactions will be the same even if the amounts have to be converted into a currency that differs from the original currency used at the store. Further, the text note attached to the transaction helps to make sure the customer sees the transaction itself.

A typical transaction would go as follows: initially, a merchant on the internet would display various goods and services for sale at a website. A customer using the internet through either a search engine or other means finds a merchant and then visits the merchant's website. Once deciding on particular goods or services the customer would like to purchase, the customer sends specific details about the price and quantity of the goods to be purchased which the merchant then stores for later use. Next the merchant accepts information about the customer's financial account such as a financial account number or perhaps, in the case of a credit card, the credit card account number and expiration date along with the type of card.

In the case of a multiple step payment process, the merchant first authorizes the transaction with the bank. Customer can see the authorization on their bank account. Next, the customer looks at the authorization and obtains the amounts of the transaction and the text information. The customer then provides that information back to the merchant. The merchant determines that the data provided by the customer matches that which the merchant submitted to the bank.

If these numbers match, the goods are shipped to the customer. The merchant then settles the transaction with the bank. Settling the transaction causes the authorization data to be finalized. When the authorization is not settled, the authorization information is eventually removed from the customer account and is no longer visible to the customer. It should be noted that such a method skips the problems of having to check or transact with a bank at a later time. In other words, the bank authorizes the charge first and then the goods are only shipped upon receipt of information from the customer. In prior methods, the bank must be involved twice, once to check the account and a second time to process authorization and settlement of payment for the goods.

In an alternative embodiment which is well suited for foreign transactions, when the merchant receives the amounts from the customer regarding how much money was authorized to be removed from the customer's account, the merchant calculates a ratio between two of the transactions and verifies that the ratio between the amounts authorized from the accounts approximates the ratio of the amounts provided by the customer. That way, if the customer is reporting in a different currency than that used by the merchant, the ratio will still be approximately the same.

In yet another embodiment, a unique text note is attached to each transaction so that when the customer looks at a bank statement, first the transaction is easy to spot and second, the text note is used as a verification code itself.

In still another embodiment, the customer permits the merchant to vary the total transactional amount between two separate prices. Once again, the merchant would process information about the customer's financial account and process an authorization of the variable total price. The customer then contacts the bank, obtains the amount of the total transaction, informs the merchant of the amount and, if the amount provided by the customer matches the amount charged to the bank, then the goods are shipped and the transaction is settled. This of course avoids the customer simply giving what he knows is already the price of the goods as a verifying amount. In other words, a fraudulent customer could obtain a credit card from somebody, look at the website, figure out exactly what the price would be and then give the merchant that price even though he has never seen the account himself. It should be noted that the processing a payment may either be just obtaining an authorization amount or it may include the actual transfer of money. If the money is transferred at this point no settlement step is needed.

Of course, as mentioned above, all of these actions are done on a computerized network and in accordance with the specific system set up by a merchant in order to enable the method described. While each of the above methods is described individually, it should be noted an embodiment might include various combinations of the individual embodiments.

DETAILED DESCRIPTION OF THE PREFERRED EMBODIMENTS

Figure 1:
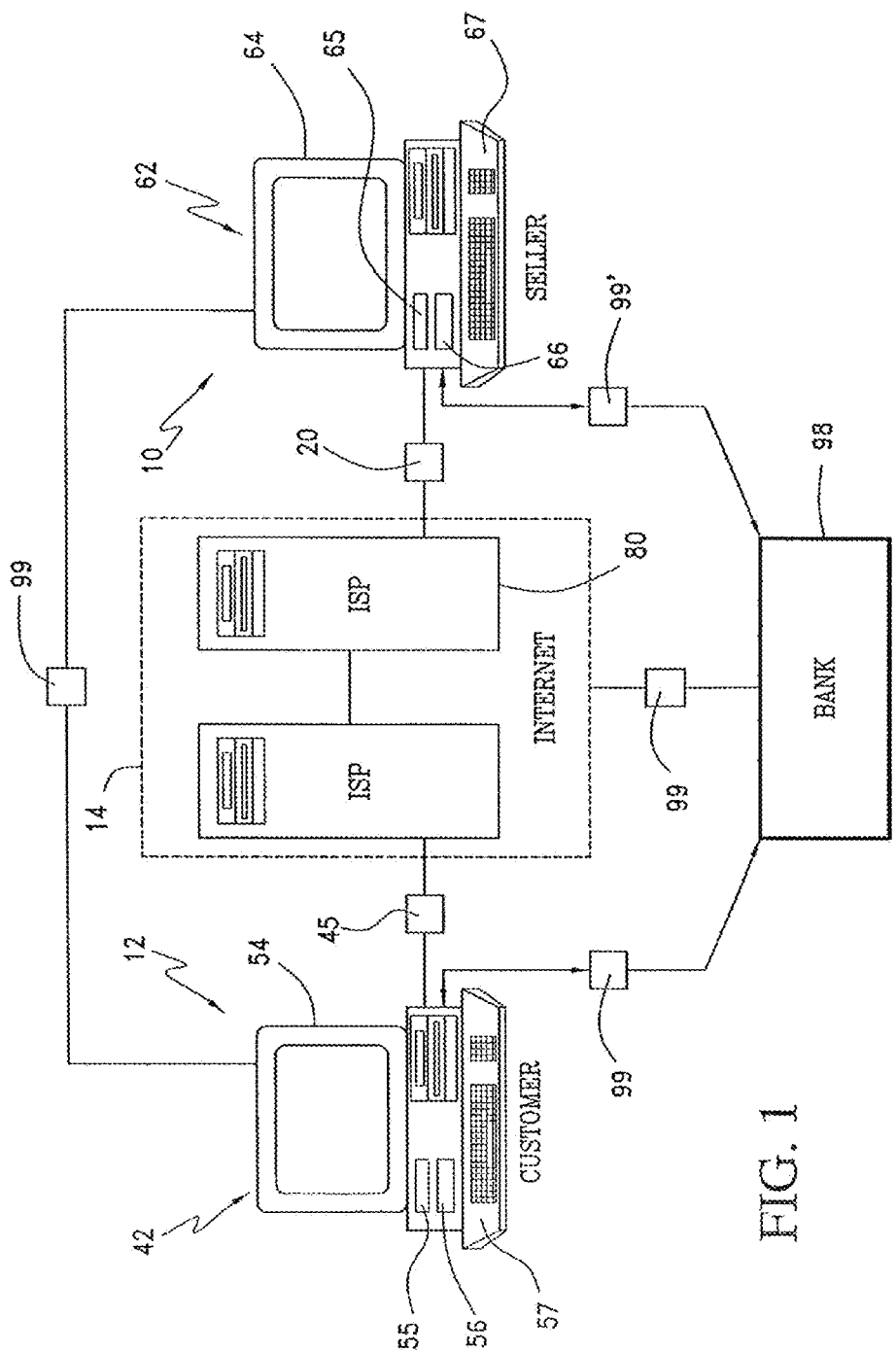
FIG. 1 is a diagram of a system with computers interconnected by the internet for a product sale or purchase in accordance with a first preferred embodiment of the invention.
Figure 2:
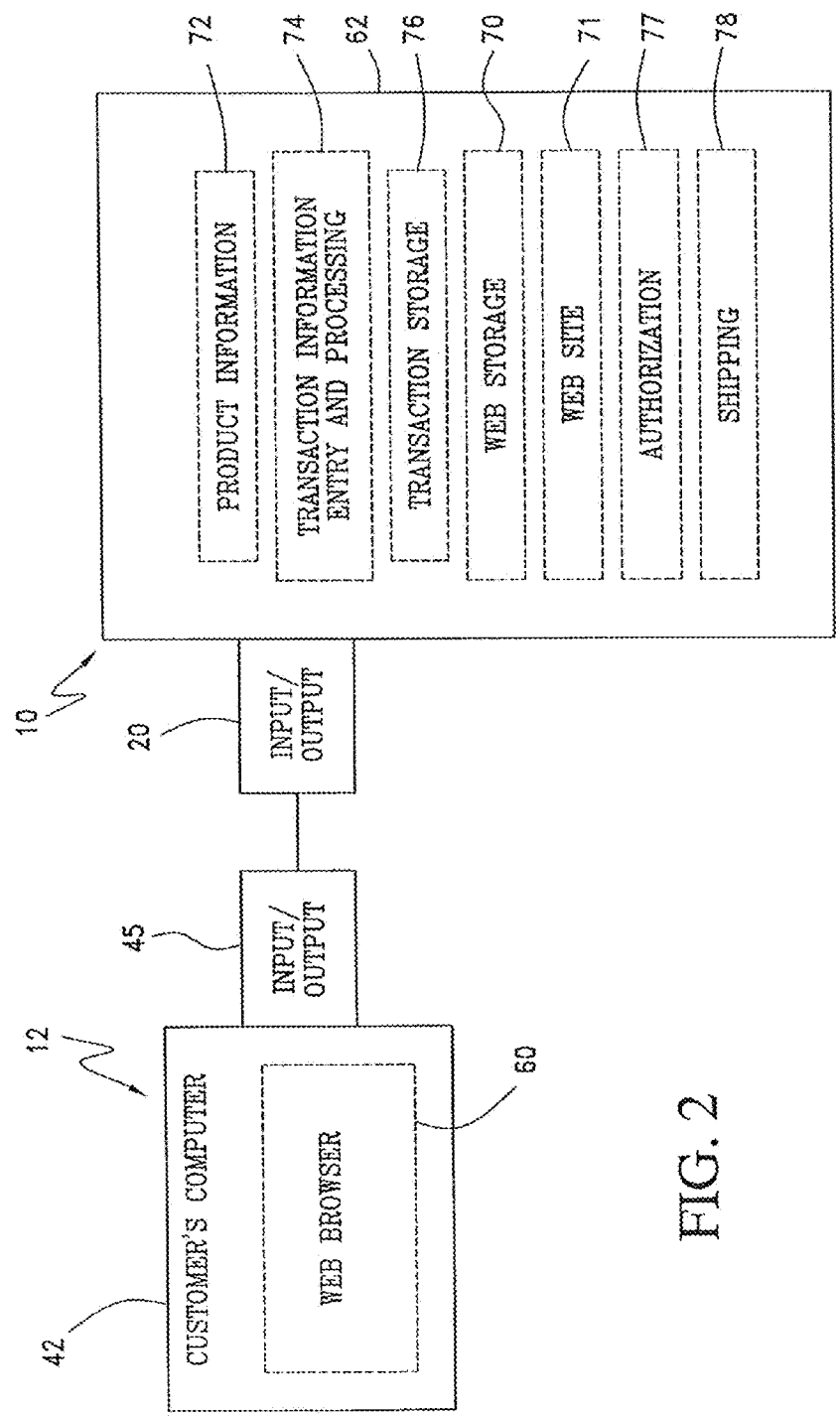
FIG. 2 is a block diagram illustrating in more detail the first preferred embodiment of the invention shown in FIG. 1.

As shown in FIG. 1, a system for handling purchase orders and payments using electronic communications link in accordance with a first preferred embodiment of the present invention includes the seller's computer system 10 which can be selectively called upon by one or more customer computer systems 12 over an electronic communications link such as the internet 14. As illustrated in FIGS. 1 and 2, seller's computer system 10 is formed of one or more computers and includes an input-output unit 20 for transmitting and receiving digital information to or from the internet 14 and indirectly to a customer's computer 42. Likewise, a customer's computer 42 is also set up to contact the internet 14 through an input-output unit 45. The customer's computer 42 typically has a monitor 54, a central processing unit 55, some type of memory 56 and an input-output unit such as a keyboard 57. Typically when in use, customer's computer 42 would have some type of operating system such as Macintosh, Unix or Windows which would run the basic operations of the computing machine. Additionally, specialized applications such as a web browser 60 would be used to interpret the various protocols of internet 14 into an understandable interface for a computer user, namely the customer.

In a similar manner, a seller's computer 62 may be formed of one or more computers, having one or more monitors 64, a central processing unit 65, some type of memory 66 and an input-output device such as a keyboard 67. Additionally, various applications such as a web server 70 and/or specialized applications that form a website 71 providing information regarding the seller's products 72, and additional applications designed to process financial transactions 74 and/or provide a database 76 for remembering and storing various bits of information regarding the various customers visiting the seller's website. Further, the seller's computer has the programming to compare inputted data 77 and authorize shipping of goods 78.

Although, in theory, the seller's computer could be part of any data network, most preferably the seller's computer system 10 is connected to the internet 14 or an internet service provider (ISP) 80 by a high speed integrated service digital network ISDN, a T-1 line, a T-3 line or any other type of communication system with other computers or ISP's which typically form the internet 14. Both seller and customer may communicate with bank 98 using the internet 14. Alternatively, the customer, seller and bank may contact each other by separate communication mechanisms 99 and 99'. Such communications could be by telephone, by talking person to person, or any other form of communication.

The operation of the seller's computer system 10 will now be described with reference to FIG. 3 which shows a flow chart 100 indicating the various steps of the process. Initially, the customer, by use of a browser 60 or other communication system, contacts the seller's computer 62 and obtains product information 72 from the seller's website 71 or any other source which could be from any website, for example, the product's original manufacturers website. Generally, during this stage, the customer might use several websites along the internet 14 to obtain both price and quality information regarding particular goods. Often, on the seller's website 71, a customer might be presented with several choices by means of the browser interface to determine the various models, types and qualities of particular goods, along with various prices. Additional links may be provided to other web pages which provide further information on each product. If, after reviewing this information, the customer desires to purchase one or more products reviewed by browser 60, in step 120, the customer enters a product purchase request which is sent over the internet 14 from the customer's computer 12 to the seller's computer 10. The seller's computer 10 then, in step 130, receives various information regarding the request including the type and quantity of goods to be purchased, along with the price of those goods. Additional information regarding the customer is also obtained, such as a shipping address and other personal information. Such a transaction can be in the form of a series of questions which are answered by the customer or, alternatively, everything can be entered on a form which is then sent in one transmission. If the form is incorrectly filled out, the seller's computer 10 will query the customer regarding the additional information needed.

In step 140, specific information regarding the customer's financial accounts is obtained. Once all the information has been obtained by the seller's computer 62, computer 62 will process payment for the goods (step 150) into two or more separate transactions, thus obtaining authorization to remove money from the customer's financial account. Typically, this step involves authorizing a specific amount per transaction, however actual payment of funds could also occur in this step. The seller's computer 62 then prompts the customer to enter the amounts of the transaction. At this point the customer would contact his/her bank 99, obtain those values, and enter them into the customer's computer 42. The bank 99 may be contacted either directly by visiting in person, by telephone, by internet 14 or by using any other form of communication.

In step 160, the information is then transferred to the seller's computer 62. In step 170, the seller's computer 62 will verify that these amounts provided by the customer do indeed match the amounts processed for the payment. If the amounts do match and are correct, the customer's account is then considered to be verified and not fraudulent and the seller's computer 62 sends an order to allow the goods to be shipped as in step 180 and settlement instructions are sent to the bank to finalize the sale. Of course, this assumes only authorization of charges occurred in step 140, if actual payment was made then the settlement instructions would not be needed. Alternatively, if the amounts do not match, the process proceeds to step 190 and goods are not shipped. The process then ends at step 195.

It should be noted that such a method will allow for payment to be made by various instruments such as credit card or check. For example, in the case of a credit card transaction, the purchaser's name, address, telephone number, type of credit card and expiration date might be obtained in order to verify sufficient information to have the transaction go forward. Additional verification of whether or not the credit card is valid may take place before the payment is processed in the two or more transactions. In a similar manner, information can be provided off a check so that a computerized check approval bureau can be contacted to determine whether or not the check is valid, even before the two or more transactions go forth. It should be noted the customer would have to approve that two or more transactions occur, rather than a single transaction. Furthermore, settlement of the check would most likely be in one step as opposed to the settlement of the credit card account which may include an initial authorization and then a settlement step.

Figure 3:
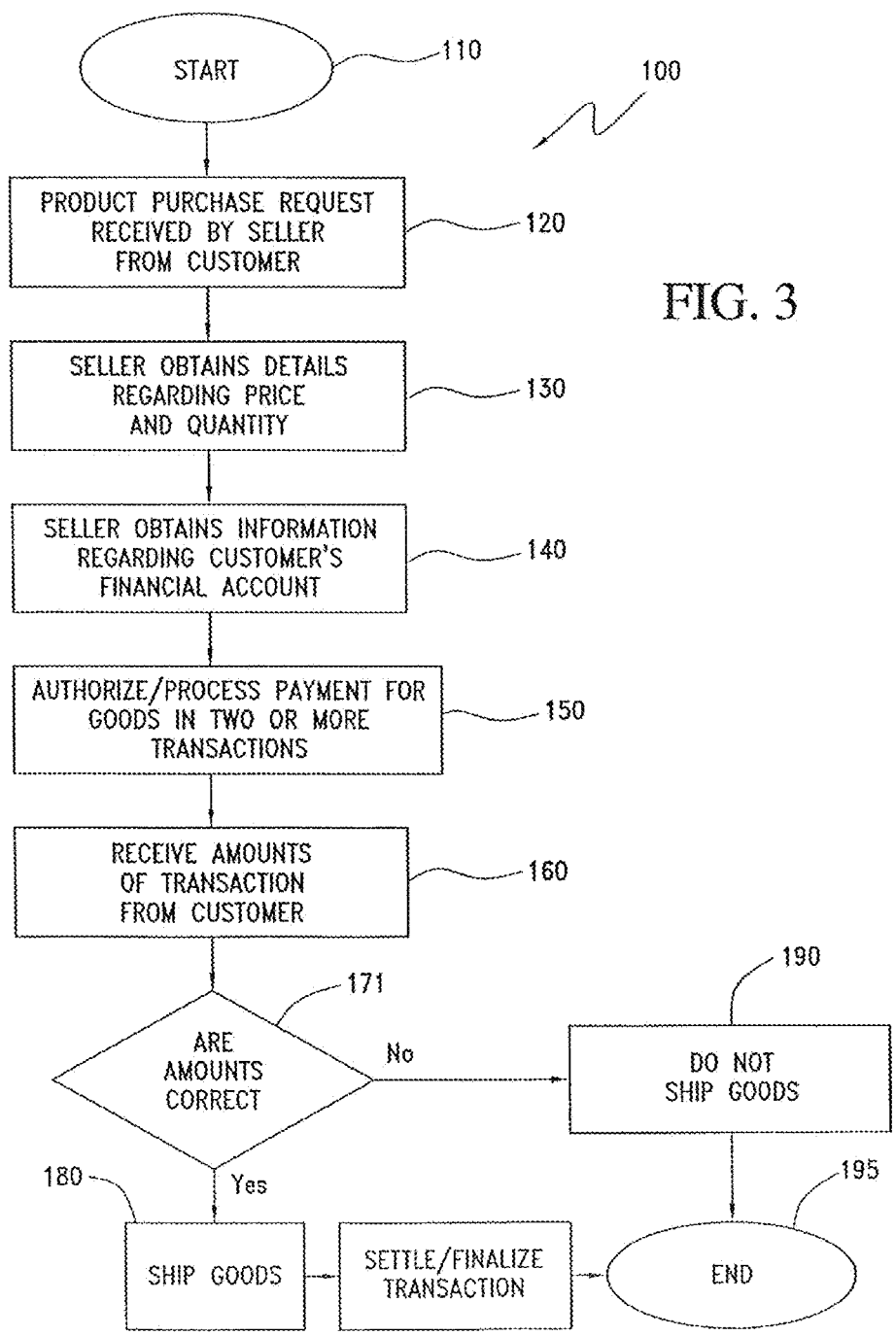
FIG. 3 is a flow chart of a computer procedure employed by the seller's computer according to a first preferred embodiment of the invention.
Figure 4:
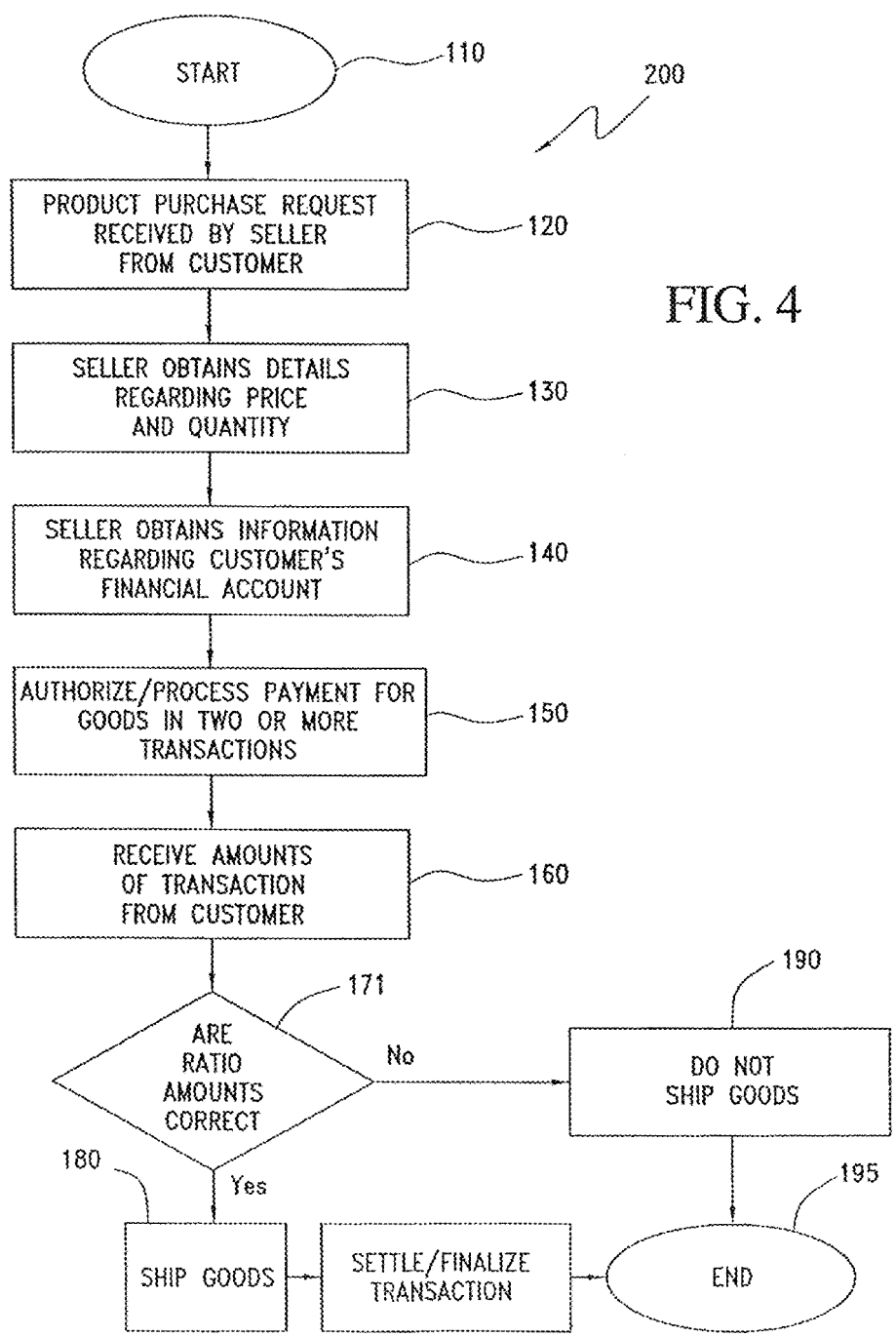
FIG. 4 is a flow chart of a computer procedure employed in the seller's computer in the system of FIG. 1 according to a second preferred embodiment of the invention.

In a second embodiment as presented in FIG. 4, a very similar process 200 to the process 100 of FIG. 3 is shown. The steps that are substantially the same will not be explained again. Instead like reference numerals refer to corresponding steps such that only the differences will be discussed here. In verifying the transaction amount in step 272, instead of comparing the two or more transaction amounts provided by the customer with those moved through the financial institution a ratio is calculated of the amounts. By comparing the ratio, the validity of the customer's accounts can be verified. Additionally, if the particular amounts are actually altered due to currency exchange rates in connection with transactions conducted in a foreign country, the actual ratio between the two numbers will not be affected.

Figure 5:
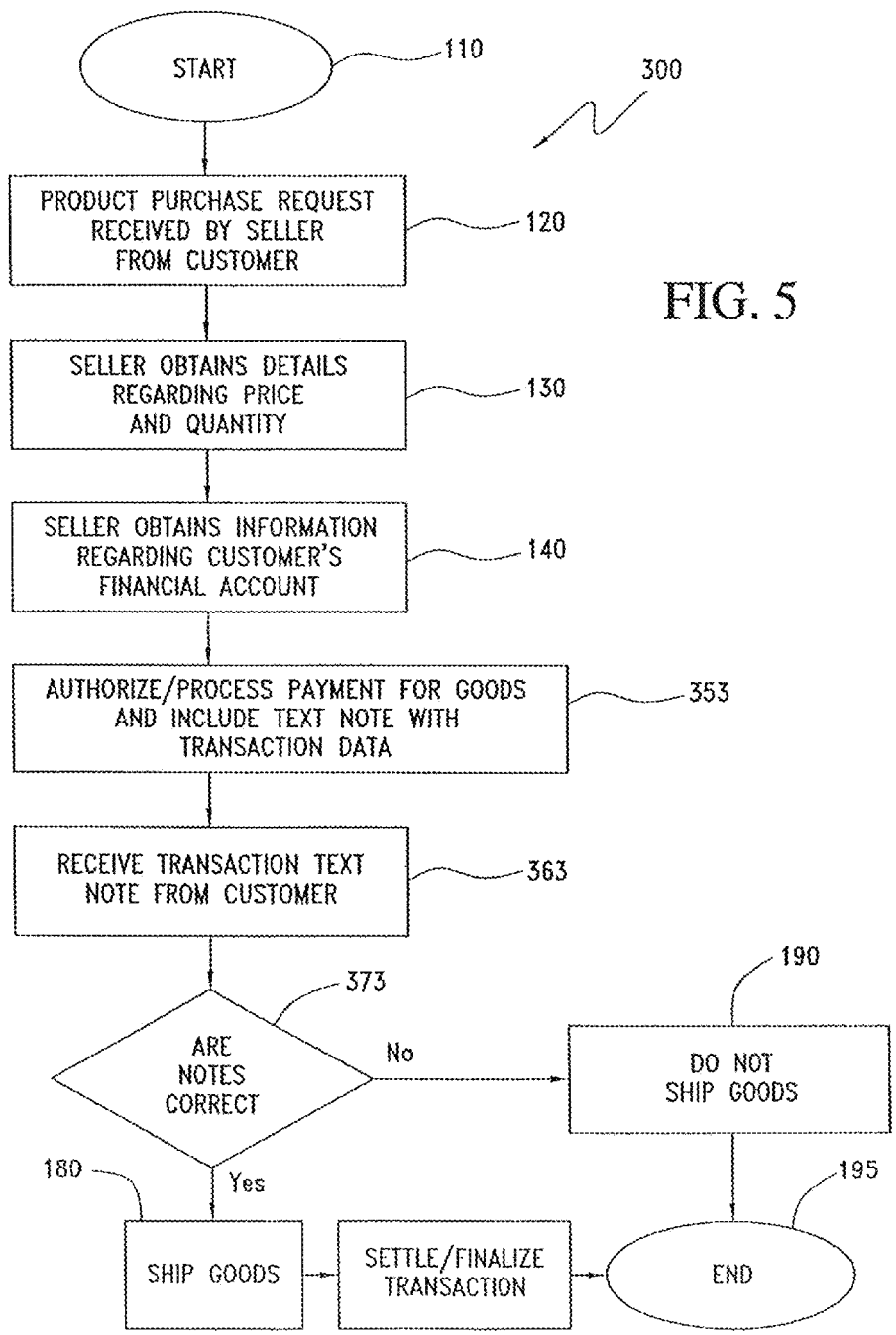
FIG. 5 is a flow chart of a computer procedure employed in the seller's computer in the system of FIG. 1 according to a third preferred embodiment of the invention.

In yet another embodiment represented by process 300 shown in FIG. 5, when the seller's computer 62 obtains information about the customer and processes a payment for goods, the payment is processed with a text note as in step 353. When the customer sees the text note on a bank statement, the customer forwards the information in the text note in step 363 back to the seller's computer 62. The seller's computer 62 then compares this text note to the note sent and once again can verify whether or not the customer is legitimate and the bank account is valid. At this point, in step 373, the seller's computer 62 either determines whether to ship the goods in step 180 or not to ship the goods in step 190, dependent upon the customer properly verifying the text note.

Figure 6:
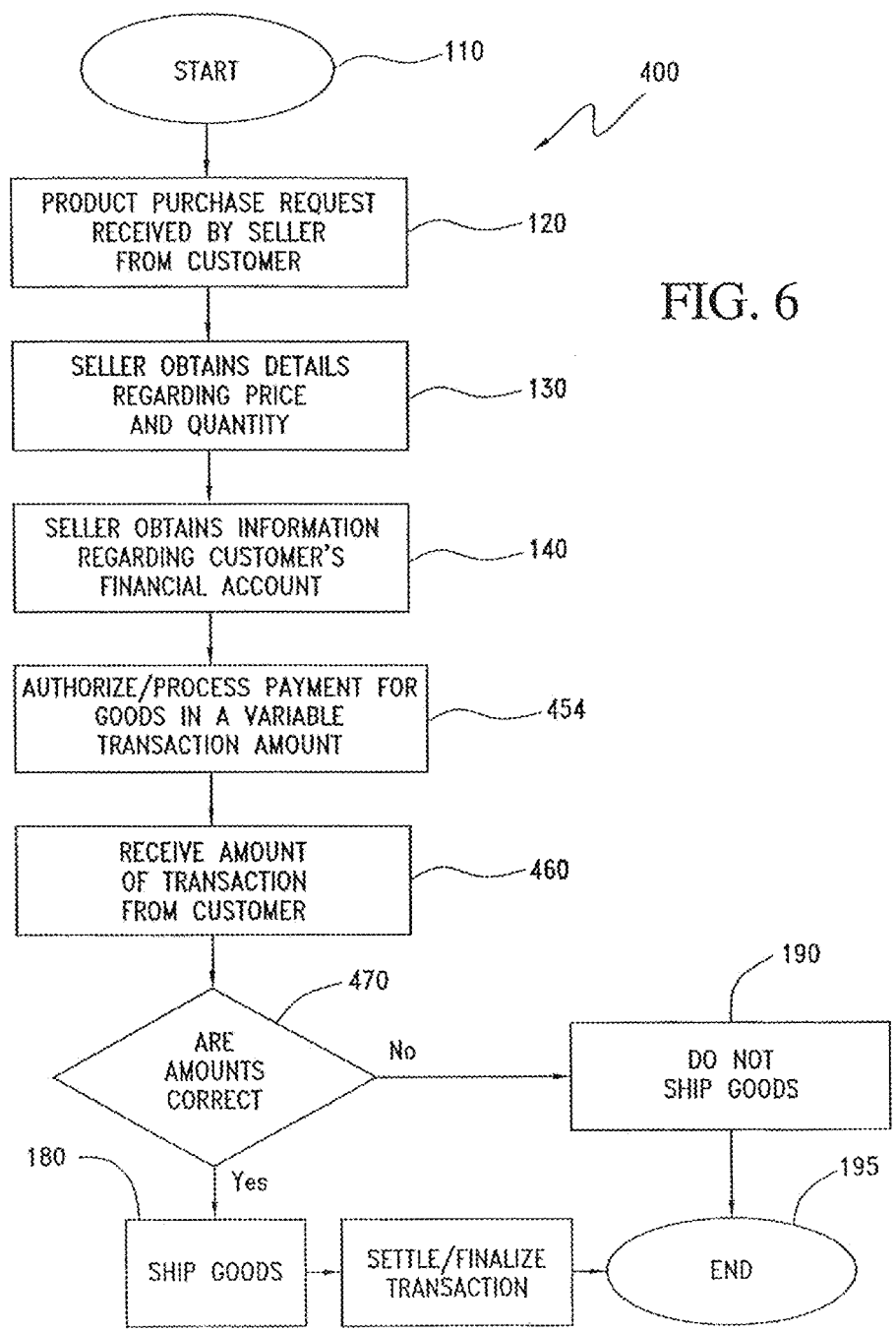
FIG. 6 is a flow chart of a computer procedure employed in the seller's computer in the system of FIG. 1 according to a fourth preferred embodiment of the invention.

FIG. 6 refers to still another method 400 according to the invention wherein the customer authorizes the seller to process payment for goods in a variable transaction which might vary between $100.00 and $106.00, (see step 454). Once again, the customer then obtains information from the bank regarding the amount of the transaction, forwards that amount to the seller's computer where the two amounts are compared in step 470. Once again, if the amounts are correct and match, then the goods are shipped in step 180, otherwise step 190 is entered and the goods are not shipped.

Although described with reference to a preferred embodiment of the invention, it should be readily understood that various changes and/or modifications can be made to the invention without departing from the spirit thereof. In general, it should be readily apparent that, in accordance with the invention, the seller relays some type of identifier information when processing payment for a business transaction. Thereafter, the customer can provide verification information, which corresponds to the identifier information, to the seller after accessing his/her account. When the seller determines that the verification information received by the customer matches the identifier information, the seller is assured that the account information is correct, and the transaction should be completed. Therefore, a simple, convenient and accurate overall verification system is established. In any event, the invention is only intended to be limited by the scope of the following claims.

I claim:

1. A method of verifying financial account information of a customer during a business transaction comprising:
   accepting from the customer, via a computer, information regarding a total price and a quantity of goods being purchased as the business transaction;
   accepting from the customer, via the computer, information about a financial account;
   relaying identifier information to the customer by processing a payment for the goods from the financial account to a seller, by obtaining an authorization for the payment and settling the authorization for the payment, wherein the payment comprises a single transaction of a variable total amount that does not equal the total price of the goods and that is between two separate prices authorized by the customer, wherein the identifier information is the variable total amount associated with the processed payment;
   receiving verification information from the customer, wherein the verification information is the variable total amount associated with the processed payment;
   comparing, via the computer, the received verification information with the relayed identifier information; and
   authorizing shipment of the goods to the customer if the received verification information corresponds to the relayed identifier information.

2. The method according to claim 1, wherein receiving the verification information from the customer is conducted over the internet.

3. The method according to claim 1, wherein the two separate prices are a value lower than the total price of the goods and a value higher than the total price of the goods.

4. A system for verifying financial account information during a business transaction comprising:
   a communications link between a customer computer and a seller computer;
   means for accepting, through the communications link, information regarding a total price and a quantity of goods being purchased by the customer as the business transaction;
   means for accepting, through the communications link, information about a financial account from the customer;
   a computer configured to relay identifier information to the customer by processing a payment for the goods from the financial account to the seller, by obtaining an authorization for the payment and settling the authorization for the payment, wherein the payment comprises a single transaction of a variable total amount that does not equal the total price of the goods and that is between two separate prices authorized by the customer, wherein the identifier information is the variable total amount associated with the processed payment;
   means for receiving verification information from the customer, wherein the verification information is the variable total amount associated with the processed payment; and
   means for authorizing shipments of the goods to the customer if the received verification information corresponds to the relayed identifier information.

5. The system according to claim 4, wherein the two separate prices are a value lower than the total price of the goods and a value higher than the total price of the goods.

6. A method of verifying financial account information of a customer during a business transaction comprising:
   accepting from the customer, via a computer, information regarding a total price and a quantity of goods being purchased as the business transaction;
   accepting from the customer, via the computer, information about a financial account;
   relaying identifier information to the customer by processing a payment for the goods from the financial account to a seller, by obtaining an authorization for the payment, wherein the payment comprises a single transaction of a variable total amount that does not equal the total price of the goods and that is between two separate prices authorized by the customer, wherein the identifier information is the variable total amount associated with the payment;
   receiving verification information from the customer, wherein the verification information is the variable total amount associated with the payment;
   comparing, via the computer, the received verification reformation with the relayed identifier information; and
   settling the authorization for the payment if the received verification information corresponds to the relayed identifier information.

7. The method according to claim 6, wherein receiving the verification information from the customer is conducted over the internet.

8. The method according to claim 6, wherein the two separate prices are a value lower than the total price of the goods and a value higher than the total price of the goods.

9. A system for verifying financial account information during a business transaction comprising:

a communications link between a customer computer and a seller computer;

means for accepting, through the communications link, information regarding a total price and a quantity of goods being purchased by the customer as the business transaction;

means for accepting, through the communications link, information about a financial account from the customer;

a computer configured to relay identifier information to the customer by processing a payment for the goods from the financial account to the seller, by obtaining an authorization for the payment, wherein the payment comprises a single transaction of a variable total amount that does not equal the total price of the goods and that is between two separate prices authorized by the customer, wherein the identifier information is the variable total amount associated with the payment;

means for receiving verification information from the customer, wherein the verification information is the variable total amount associated with the payment; and means for authorizing shipments of the goods to the customer if the received verification information corresponds to the relayed identifier information; and means for settling the authorization for the payment if the received verification information corresponds to the relayed identifier information.

10. The system according to claim 9, wherein settling the authorization for the payment includes a transfer of money.

11. The system according to claim 9, wherein the two separate prices are a value lower than the total price of the goods and a value higher than the total price of the goods.

* * * * *